United States Patent
Sufczynski et al.

(10) Patent No.: US 7,781,025 B2
(45) Date of Patent: Aug. 24, 2010

(54) METHOD FOR OPENING AN AUTOMOTIVE FUEL DOOR

(75) Inventors: David F. Sufczynski, Harrison Township, MI (US); Robert J. Campbell, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1143 days.

(21) Appl. No.: 11/382,068

(22) Filed: May 8, 2006

(65) Prior Publication Data

US 2007/0266541 A1 Nov. 22, 2007

(51) Int. Cl.
*B05D 3/00* (2006.01)
*B23P 19/04* (2006.01)
*B21D 53/88* (2006.01)

(52) U.S. Cl. .................. 427/444; 29/460; 29/897.2
(58) Field of Classification Search .............. 427/444; 29/460, 897.2
See application file for complete search history.

(56) References Cited

U.S. PATENT DOCUMENTS 4,498,414 A * 2/1985 Kiba et al. .................. 118/663
5,675,865 A * 10/1997 van der Steur .................. 16/82

FOREIGN PATENT DOCUMENTS

| DE | 3244053 C2 | 12/1986 |
| DE | 19832910 C2 | 3/2003 |
| EP | 0990548 A2 | 4/2000 |

OTHER PUBLICATIONS

Machine translation of EP0990548A2.*
Machine translation of EP0990548A2, original publication date Apr. 5, 2000, translation generated Nov. 9, 2009.*

* cited by examiner

*Primary Examiner*—Michael Cleveland
*Assistant Examiner*—Nathan H Empie

(57) ABSTRACT

A tool having a grip head and a stem is placed behind the body panel to which the fuel door is hinged. The grip head interfaces with the goose neck of the fuel door at a location not visible to an onlooker when the fuel door is at its open position. The grip head has a predetermined shape which allows it to grasp the goose neck, whereby rotation of the stem (manually or robotically) results in opening and closing of the fuel door selectively as needed for a painting process to ensue.

9 Claims, 4 Drawing Sheets

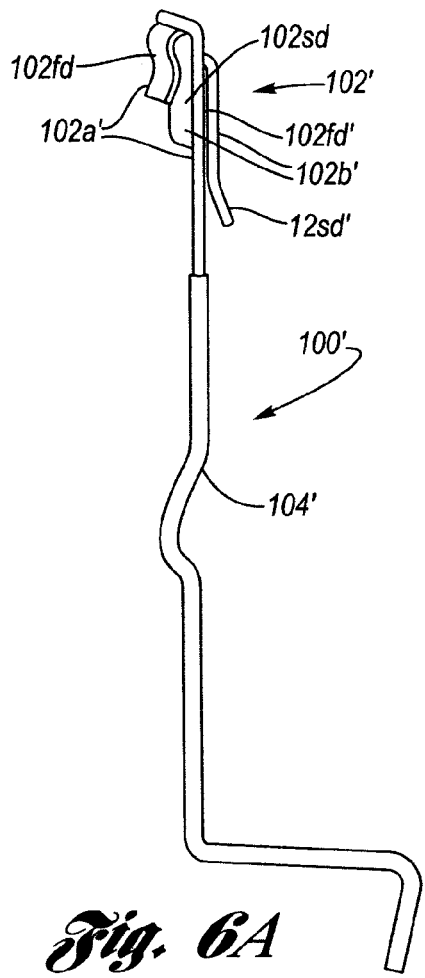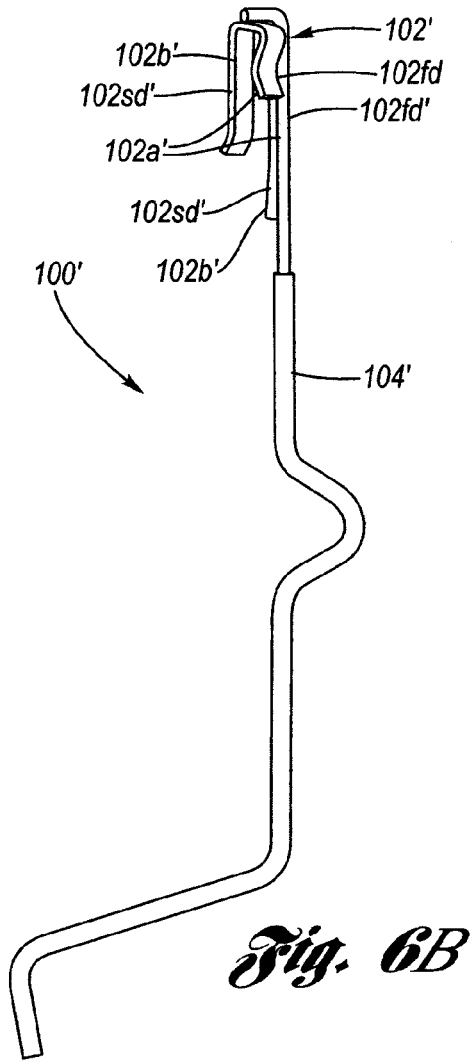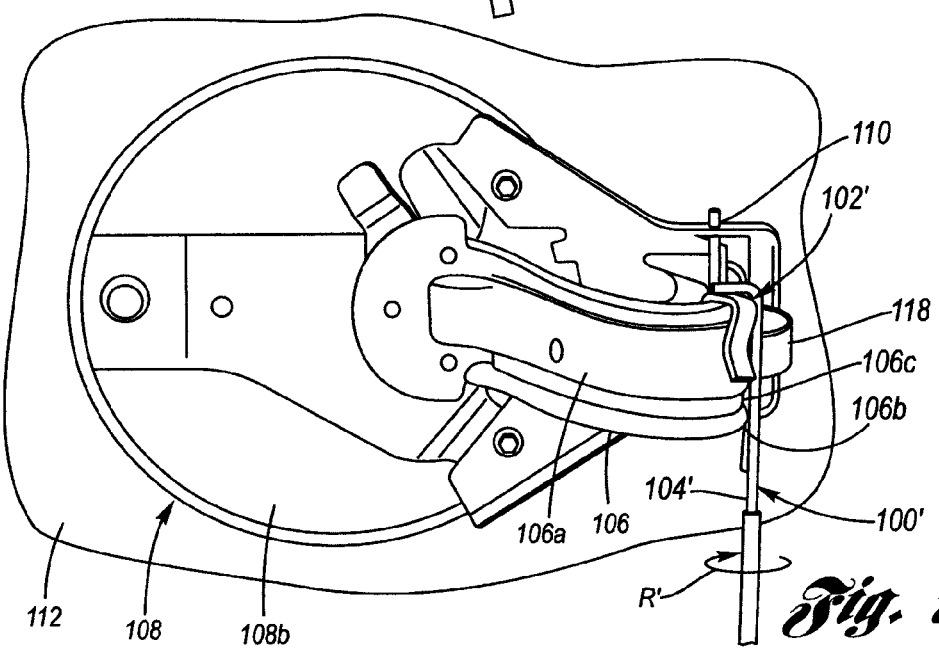

METHOD FOR OPENING AN AUTOMOTIVE FUEL DOOR

TECHNICAL FIELD

The present invention relates to motor vehicle fuel doors which are hinged to a body panel of the motor vehicle and provide cosmetic cover of, and access to, the fuel cap of the motor vehicle. More particularly, the present invention relates to a method for opening a fuel door during a painting operation, wherein there is no touching of the fuel door such that the painting operation may be performed without impediment associated with opening (and/or closing) of the fuel door thereduring.

BACKGROUND OF THE INVENTION

The painting process of motor vehicles generally involves primer and top coat paint applications. It is important for corrosion resistance to ensure that all scheduled areas of the external body panels of the vehicle are properly painted, and indeed it is equally important that the painting process provide a pleasingly flawless finish.

One area of the painting process which is of concern with respect to providing a flawless finish has to do with the area around the fuel door. The fuel door is hinged to an exterior body panel to provide, when at its closed position (whereat the fuel door is oriented generally parallel to the body panel) a cosmetic cover of the fuel cap, and when at its open position (whereat the fuel door is oriented generally perpendicular to the body panel) access to the fuel cap for fueling purposes. Not only must the body panel be painted, but the fuel door including its outer and inner surfaces as well as its periphery, the visible portion of the goose neck which hingably supports the fuel door, and the fuel pocket surrounding the fuel cap all need painting, as well.

Referring to FIGS. 1A and 1B, a prior art method of opening a fuel door during a painting process is depicted. A door opener 10 is attached to the inner surface 12a of a fuel door 12. The fuel door is able to pivot between its open position and its closed position via a gooseneck 16 which is hinged and spring biased closed with respect to a body panel 14. The door opener 10 has a bracket 10a which removably clips onto the edges of reinforcement features 12b of the inner surface 12a, and further an arm 10b which extends outwardly from the periphery 12p of the fuel door 12.

In operation, a paint process is performed, whereduring the fuel door 12 is initially at its closed position and the paint process is applied to the body panel 14 and the outer surface 12c of the fuel door. Next the arm 10b of the door opener 10 is grabbed manually or by a robot, whereupon the fuel door 12 is pivoted to its open position. Now, the paint process is applied to the inner surface 12a of the fuel door 12, a visible portion of the goose neck 16 and the fuel pocket. Of course, for the inner surface 12a of the fuel door 12 to be painted, the door opener 10 needs to first be removed.

While the aforementioned technique works well, it risks the paint finish of the body panel being affected by the presence of the door opener 10 during the paint process. For example: the arm can cause shadowing of the paint finish; paint and dirt can accumulate onto the door opener; the bracket 10a and the arm 10b can occlude portions of the inner surface of the fuel door from being properly painted; and marring can occur when the door opener is disengaged from the fuel door.

Accordingly, what remains needed in the art is a new technique for opening the fuel door during a paint process such that the paint finish is everywhere flawless.

SUMMARY OF THE INVENTION

The present invention is a method for opening (and/or closing) the fuel door during a paint process such that the paint finish is everywhere flawless in that a door opener arm is obviated for opening (and/or closing) of the fuel door thereduring.

According to the method of the present invention, a tool having a grip head and a stem connected to the grip head is placed behind the body panel to which the fuel door is hinged, as for example by accessing a wheel well. The grip head grippingly interfaces with the goose neck of the fuel door at a location not visible to an onlooker when the fuel door is at its open position, that is, at a position that is not painted during the painting process. The grip head has a predetermined shape which allows it to grasp the goose neck, as for example opposed first and second abutments between which the goose neck is placed, whereby rotation of the tool, as for example by manual or more preferably robotic rotation of the stem, results in the goose neck pivoting at the hinge which in turns effects opening (or closing) of the fuel door per an appropriate direction of rotation (i.e., clockwise or counterclockwise) of the stem.

In operation of the method of the present invention, manually, or more preferably robotically, the tool is moved behind the body panel, as for example by accessing the wheel well of the motor vehicle whereat is located the fuel door. The grip head is then maneuvered so as to grippingly interface with the goose neck, preferably at a location generally adjacent the hinge connection point of the goose neck to the body panel. Thereupon, a painting process ensues, wherein the fuel door open or closed position is selectively changed by manual, or more preferably robotic, rotation of the tool which causes pivoting of the goose neck at the hinge so that the painting process may proceed with the fuel door open or closed as necessary. When the position of the fuel door need no longer be changed, the tool is disengaged from the goose neck and moved away from the motor vehicle.

Because the grip head is located on the goose neck proximal with respect to the hinge and remote with respect to the fuel door, the paining of the body panel, fuel door, goose neck and fuel pocket can all proceed without any interference, obstruction, hampering or other impediment with respect to the grip head. It is to be understood that the reason the tool cannot adversely affect the painting process is because the tool (grip head and stem) is positioned at a location of the goose neck where the painting process does not occur.

Accordingly, it is an object of the present invention to provide a method for opening (and closing) of a fuel door by causing pivoting movement of the fuel door goose neck at its hinge, wherein the pivoting is effected from a location on the goose neck which is not involved in the painting process.

This and additional objects, features and advantages of the present invention will become clearer from the following specification of a preferred embodiment.

BRIEF DESCRIPTION OF THE DRAWINGS

FIGS. 6A and 6B are side views of a preferred tool for opening and closing of a fuel door according to the method of the present invention.

FIG. 7 is an inner side view of a fuel door with its goose neck in a closed position with respect to a body panel as in FIG. 2, wherein the grip head of the tool of FIGS. 6A and 6B has now gripped the goose neck according to the method of the present invention.

DESCRIPTION OF THE PREFERRED EMBODIMENT

Figure 1A:
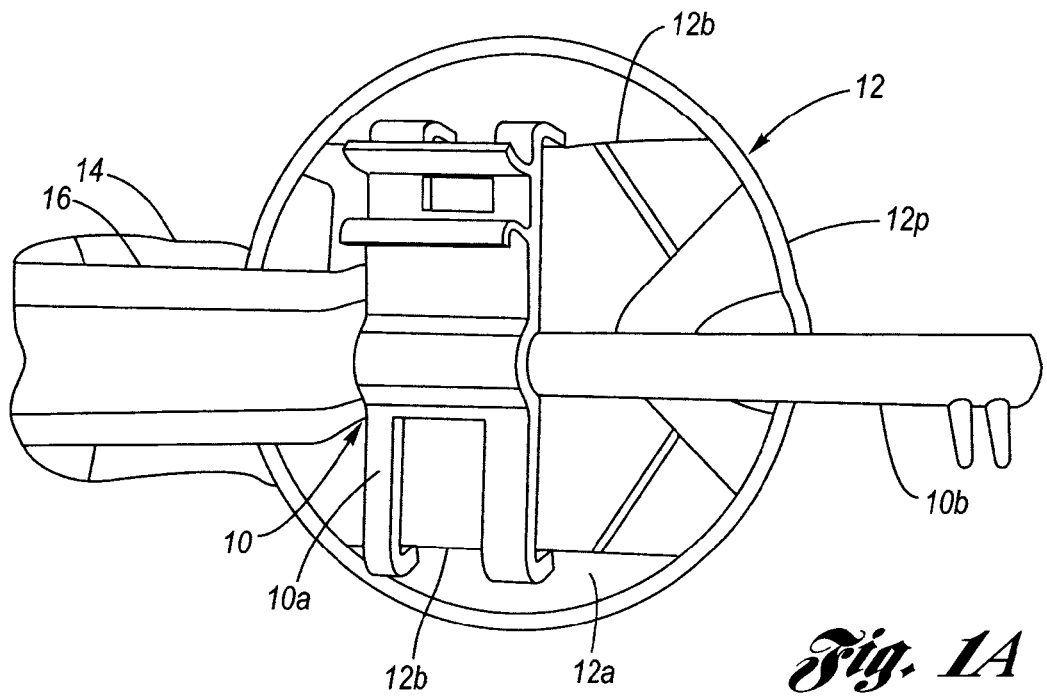
FIG. 1A is a side view of a fuel door, showing the inner side thereof equipped with a conventional paint process door opener.

Referring now to the Drawing, FIGS. 2 through 7 depict exemplar views for carrying out the method according to the method of the present invention of opening (and/or, if desired, also closing) of a fuel door during a painting process.

According to the method of the present invention, a tool has a grip head and a stem connected to the grip head. The grip head is configured for grasping the goose neck 106 of a fuel door 108. The grip head is in the form of a first abutment feature and a second abutment feature which is spaced from, and in opposing relation to, the first abutment feature, wherein an opening is formed therebetween such that the goose neck is receivable between the first and second abutment features. In order that the tool (inclusive of the grip head and the stem) not adversely affect the painting process, the grip head grips the goose neck at a location not subject to the painting process, generally adjacent the hinge 110 of the goose neck whereat the goose neck hingably attaches to a body panel 112.

The abutment features may have any suitable shape such that when the goose neck is situated therebetween, a rotation of the stem of the tool will cause a commensurate rotation of the goose neck 106 at its hinge 110 relative to the body panel 112, wherein the pivoting of the goose neck causes the fuel door 108 to move between its closed and open positions. In order that the grip head be enabled to exert a torque of the goose neck such that the goose neck pivots at its hinge, at least one of the abutment features is laterally elongated along the length goose neck.

Figure 2:
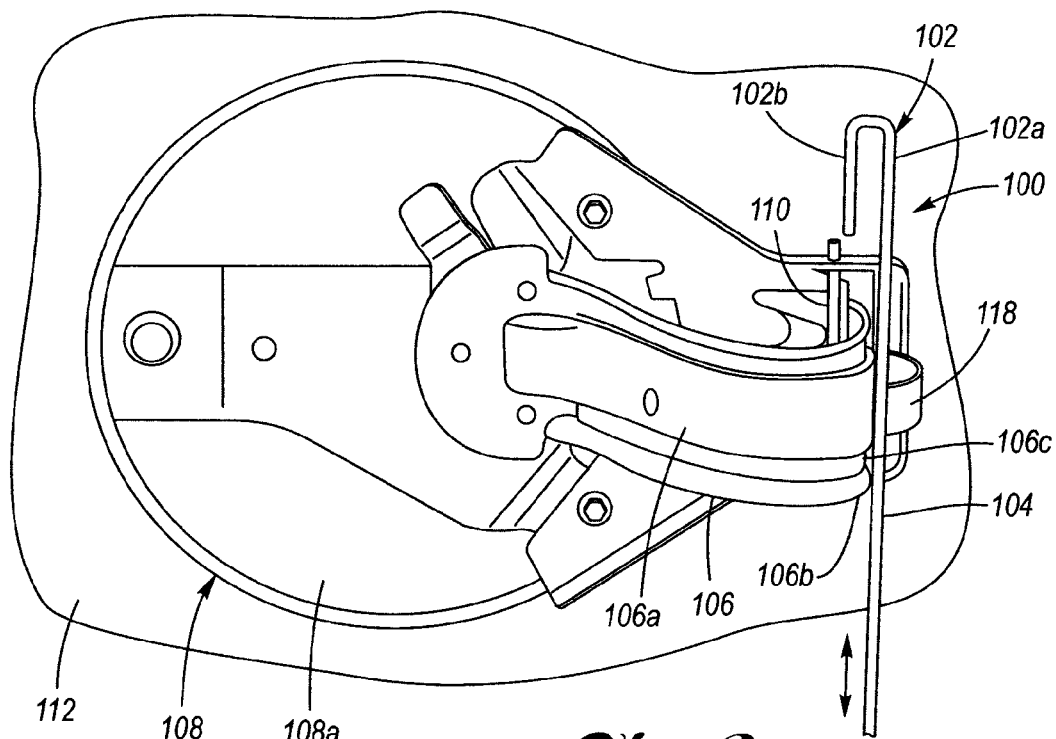
FIG. 2 is an inner side view of a fuel door with its goose neck in a closed position with respect to a body panel, wherein a tool having a grip head is being manipulated toward the goose neck according to the method of the present invention.
Figure 3:
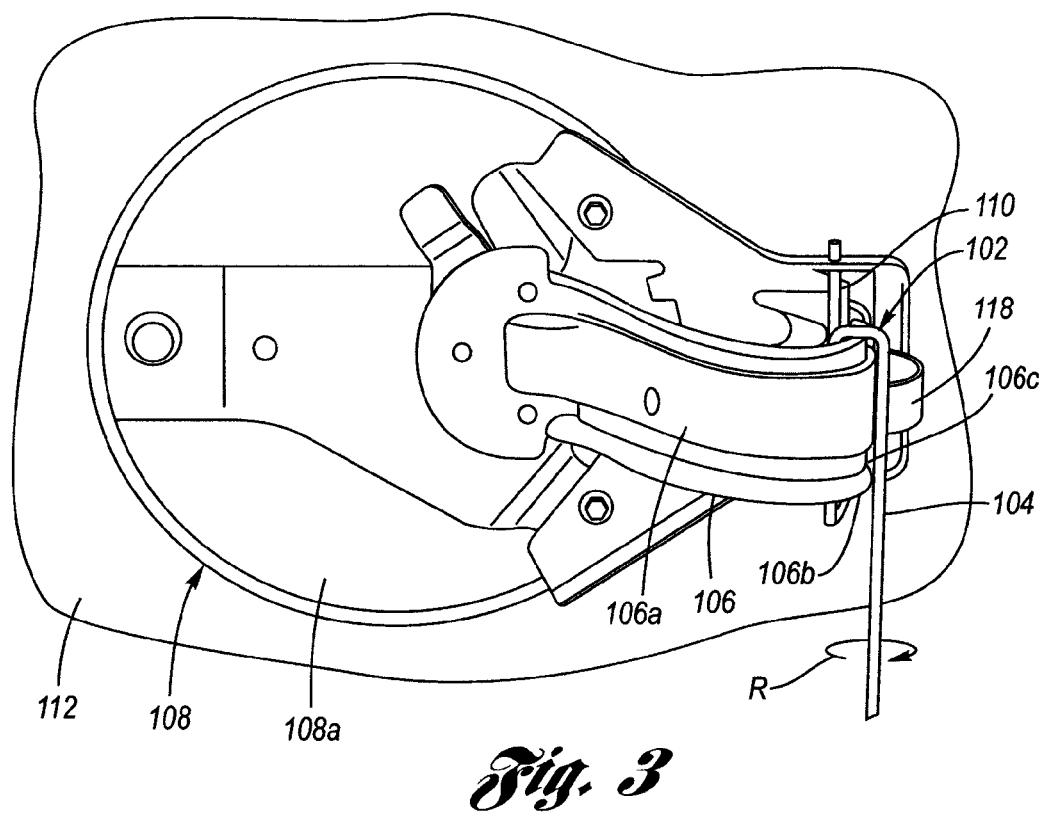
FIG. 3 is an inner side view of the fuel door with its goose neck in a closed position with respect to a body panel as in FIG. 2, wherein the grip head of the tool has now gripped the goose neck according to the method of the present invention.
Figure 4:
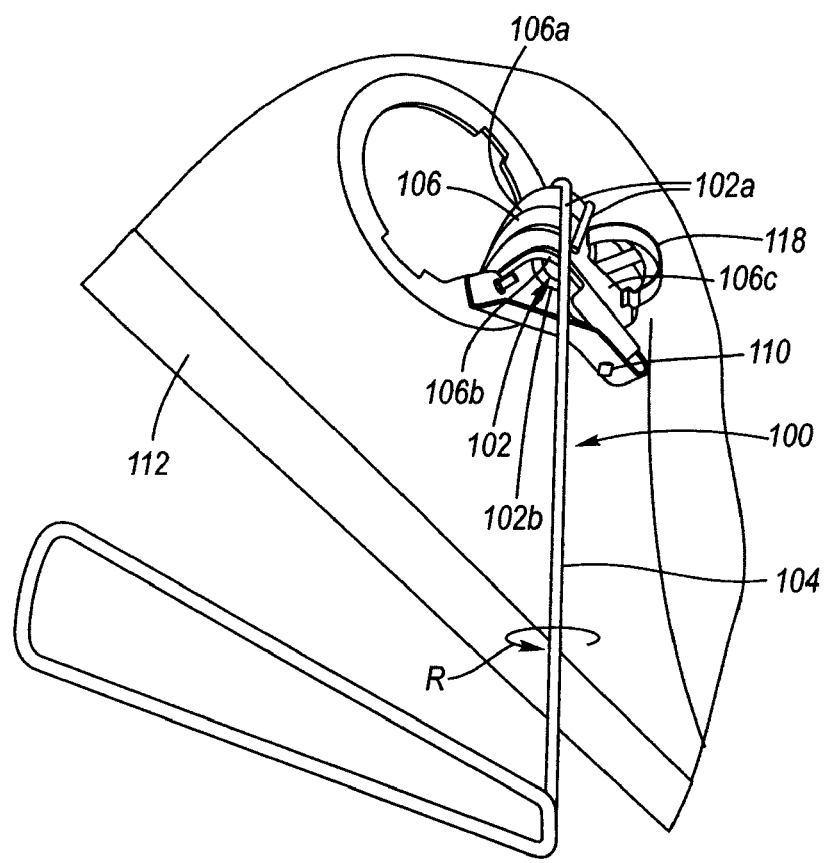
FIG. 4 is an inner perspective view of the fuel door with its goose neck in a closed position with respect to a body panel, wherein the fuel pocket is removed for clarity, and wherein the tool has been rotated to cause the fuel door to assume its open position according to the method of the present invention.
Figure 5:
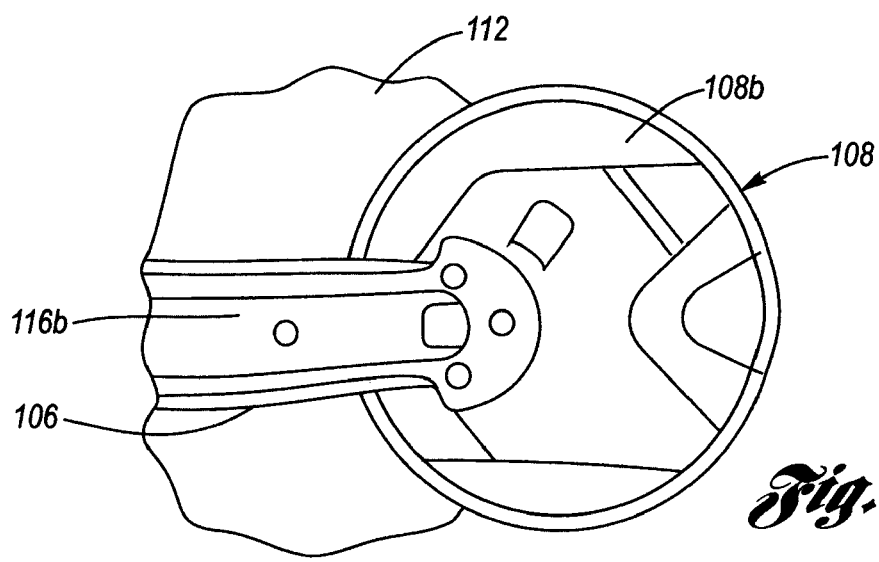
FIG. 5 is an inner side view of the fuel door of FIG. 4 in the open position.

By way of example, FIGS. 2 through 4 depict a first tool 100, and FIGS. 6A through 7 depict a second, most preferred, tool 100' wherein it is to be understood that the method according to the present invention may be carried out by any suitable tool which is capable of performing the steps of the method.

Referring firstly to the method as it is depicted by way of exemplification with respect to FIGS. 2 through 5, the first tool 100 has a grip head 102 and a stem 104 formed of a single piece of rod which has been appropriately bent so that at the grip head the first abutment 102a is in the form of a V-shaped configuration that includes a portion of the stem, and the second abutment feature 102b is in the form of a loop.

In operation of the method according to the present invention with respect to exemplar use of the first tool 100, manually, or more preferably robotically, the first tool 100 is moved behind a body panel 112 (shown best at FIG. 4), as for example by accessing a wheel well whereabove is generally located the fuel door. The grip head 102 is then maneuvered so as to grippingly interface with the goose neck 106 preferably at a location generally adjacent the connection of the hinge 110 connection of the goose neck to the body panel 112 whereat the painting process does not apply. For example as shown at FIG. 4, the grip head 102 of the first tool 100 grips the goose neck 106 between the first bend 106b of the goose neck and the hinge 110.

Thereafter a painting process ensues, wherein the fuel door position is selectively changed by manual, or more preferably robotic, rotation of the tool 100 via the stem 104 so that the painting process may proceed with the fuel door 108 at its open or closed position as is necessary for the paining process to ensue. When the position of the fuel door 108 need no longer be changed, the tool 100 is disengaged from the goose neck 106 and moved away from the motor vehicle.

Figure 1B:
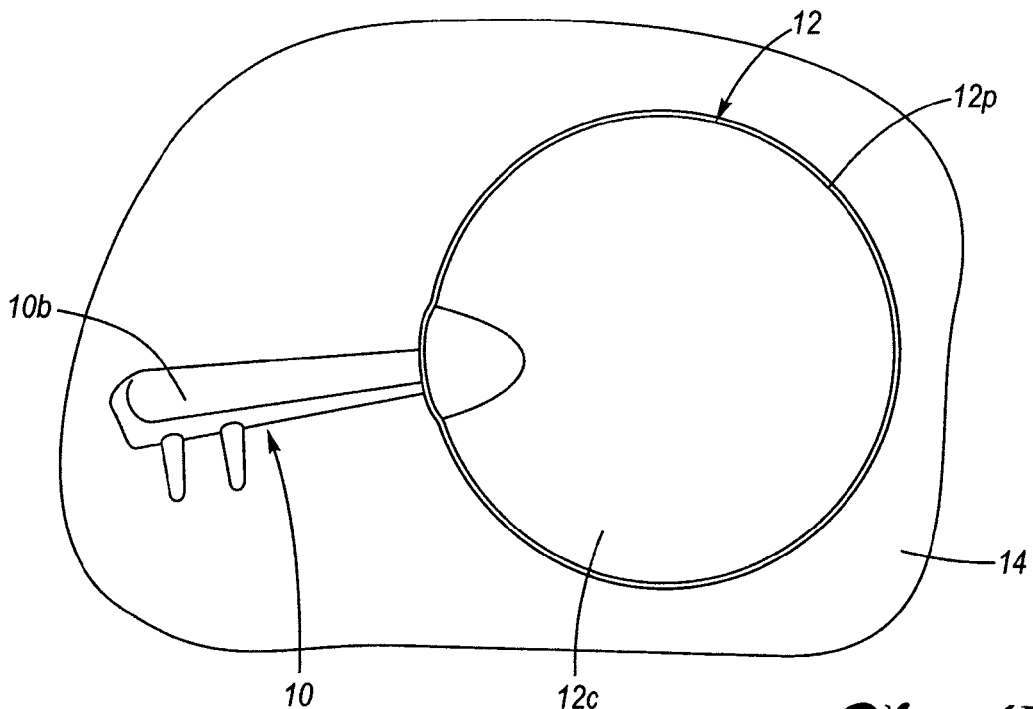
FIG. 1B is a side view of the fuel door of FIG. 1A, showing the outer side thereof, wherein an arm of the conventional paint process door opener is visible.

For example, a paint process is initially performed with the fuel door at its closed position as shown at FIG. 3, and the paint process is applied to the body panel 112 and the outer surface of the fuel door 108 (understood by looking at FIG. 1B with understanding that the arm 10b is absent). Thereupon, the stem 104 is rotated manually, but preferably robotically, counterclockwise R (see FIGS. 3 and 4) which, in turn, rotates the goose neck on the hinge 110 against biasing of the goose neck spring 118, wherein the connected fuel door 108 assumes its open position, as shown at FIG. 4. Now, the paint process is applied to the inner surface 108b of the fuel door, a visible portion 106a of the goose neck 106 (as for example between the fuel door and the first bend 106b of the goose neck) and the fuel pocket.

Because the grip head 102 is located on the goose neck 106 at a portion 106c that is remote with respect to the fuel door 108, the location being not visible to an onlooker looking at the fuel pocket and the location being not subject to the painting process, the painting of the body panel 112, fuel door 108, visible portion 106a of the goose neck 106 and fuel pocket can all proceed without any interference, obstruction or hampering with respect to the tool (inclusive of both the grip head and the stem).

To the extent that the tool 100 is attached to the goose neck 106 at a location spaced from the hinge 106, the pivoting of the goose neck on the hinge in response to rotation of the stem 104 will involve a lateral displacement of the tool with respect to the body panel 112 which is related to the distance of separation.

From the foregoing description, it will be noted that in order for the grip head to effect rotation of the goose neck 106 on the hinge 110 when the stem is rotated, at least one of the first and second abutment features must have a lateral elongation with respect to the goose neck length in order for the rotation of the stem to apply a torque to the goose neck to cause it to pivot on its hinge. By way of example, a simple grip head which is capable of exerting a torque on the goose neck need merely have a first abutment feature having single first digit and a second abutment feature having two second digits, the two digits being spaced apart laterally in relation to each other along the length of the goose neck.

Referring next to the method as it is depicted by way of exemplification with respect to FIGS. 6A through 7, the second tool 100' (which is most preferred) has a grip head 102' and a stem 104' connected thereto. The grip head 102' is composed of a first abutment feature 102a' in the form of two mutually spaced apart first digits 102fd, 102fd' (which includes a portion of the stem) and a second abutment feature 102b' in the form of two mutually spaced apart second digits 102sd, 102sd'.

In operation of the method of the present invention, manually, or more preferably robotically, the second tool 100' is moved behind the body panel (as for example in the manner as described with respect to FIG. 4) whereat the fuel cap 108 is hinged via its goose neck 106. The grip head 102' is then maneuvered so as to grippingly interface with the goose neck 106 preferably at a location generally adjacent the hinge 110 of the goose neck, in this case at the first bend 106b of the goose neck.

Thereafter a painting process ensues, wherein the fuel door position is selectively changed by manual, or more preferably robotic, rotation of the tool 100' via the stem 104' so that the painting process may proceed with the fuel door 108 at its open or closed position as is necessary for the paining process to ensue. When the position of the fuel door 108 need no longer be changed, the tool 100' is disengaged from the goose neck 106 and moved away from the motor vehicle.

For example, a paint process is initially performed with the fuel door 108 at its closed position as shown at FIG. 7, and the paint process is applied to the body panel 112 and the outer surface of the fuel door. Thereupon, the stem 104' is rotated manually, but preferably robotically, counterclockwise R' (see FIG. 7) which, in turn, rotates the goose neck on the hinge 110 against biasing of the goose neck spring 118, wherein the connected fuel door 108 assumes its open position (analogous to the position shown at FIG. 4). Now, the paint process is applied to the inner surface 108b of the fuel door, a visible portion 106a of the goose neck 106 (as for example between the fuel door and the first bend 106b of the goose neck) and the fuel pocket.

Again, because the grip head 102' is located on the goose neck 106 at a portion 106c that is remote with respect to the fuel door 108 at a location which is not visible to an onlooker looking at the fuel pocket and which is not subject to the painting process, the painting of the body panel 112, fuel door 108, the visible portion 106a of the goose neck 106 and fuel pocket can all proceed without any interference, obstruction or hampering with respect to the tool (inclusive of both the grip head and the stem).

Again, to the extent that the tool 100' is attached to the goose neck 106 at a location spaced from the hinge 106, the pivoting of the goose neck on the hinge in response to rotation of the stem 104 will involve a lateral displacement of the tool with respect to the body panel 112 which is related to the distance of separation.

It will once again be noted that in order for the grip head to effect rotation of the goose neck 106 on the hinge 110 when the stem is rotated, the first and second abutment features 102a', 102b' each have, respectively, a lateral elongation with respect to the goose neck length in order for the rotation of the stem to apply a torque to the goose neck to cause it to pivot on its hinge.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for selectively pivoting a gas door of a motor vehicle, said method comprising the steps of:
    hingably connecting the gas door to a body panel of the motor vehicle by a goose neck;
    providing a tool;
    placing the tool in proximity of the goose neck;
    gripping the goose neck by direct abutment of the tool with respect to the goose neck;
    rotating the tool so as to thereby rotate the goose neck to cause the gas door to move between a closed position and an open position with respect to the body panel; and
    removing the tool from the proximity of the goose neck.

2. The method of claim 1, wherein said step of rotating is predetermined to coincide with predetermined painting steps of a painting process.

3. The method of claim 1, wherein said step of gripping comprises:
    receiving the goose neck between mutually separated first and second abutment features.

4. The method of claim 3, wherein said step of rotating comprises:
    rotating the first and second abutment features to thereby cause said rotating of the goose neck.

5. The method of claim 4, wherein said step of rotating is predetermined to coincide with predetermined painting steps of a painting process.

6. A method for selectively pivoting a gas door of a motor vehicle,
    wherein a body panel of the motor vehicle has an outer panel surface side and an opposite inner panel surface side, said method comprising the steps of:
    hingably connecting the gas door to the body panel at inner panel surface side thereof by a goose neck;
    providing a tool comprising a grip head and a stem;
    placing the tool in proximity of the goose neck at the inner panel surface side of the body panel;
    gripping the goose neck by direct abutment of the grip head with respect to the goose neck;
    rotating the stem to thereby rotate the goose neck and thereby cause the gas door to move between a closed position and an open position with respect to the body panel; and
    removing the tool from the proximity of the goose neck.

7. The method of claim 6, wherein said step of rotating is predetermined to coincide with predetermined painting steps of a painting process.

8. The method of claim 6, wherein said step of gripping comprises:
    receiving the goose neck between mutually separated first and second abutment features of the grip head.

9. The method of claim 8, wherein said step of rotating is predetermined to coincide with predetermined painting steps of a painting process.

* * * * *